United States Patent [19]

Klein

[11] Patent Number: 4,870,840

[45] Date of Patent: Oct. 3, 1989

[54] MODULAR COMMUNICATIONS JACK LOCK

[76] Inventor: Edward Klein, 2 Professional Dr., Ste. 232, Gaithersburg, Md. 20879

[21] Appl. No.: 306,681

[22] Filed: Feb. 6, 1989

[51] Int. Cl.⁴ ............................................. E05B 73/00
[52] U.S. Cl. .................................. 70/57; 70/DIG. 72; 439/133
[58] Field of Search ............... 70/57, 58, 14, DIG. 72; 439/133; 379/443, 445

[56] References Cited

U.S. PATENT DOCUMENTS 4,311,883 1/1982 Kidney .............................. 379/443
4,647,726 3/1987 Blum .................................. 379/445
4,740,168 4/1988 Carney ............................. 439/133

FOREIGN PATENT DOCUMENTS 1167935 4/1964 Fed. Rep. of Germany ...... 439/133

Primary Examiner—Robert L. Wolfe

[57] ABSTRACT

A device for locking and unlocking an unused modular communication's socket comprising a sliding wedge which positioned under leaf spring of socket plug prevents plug from being removed from modular socket while wedge is locked into position, rendering socket unusable while plug is engaged in socket.

6 Claims, 3 Drawing Sheets

MODULAR COMMUNICATIONS JACK LOCK

REFERENCES CITED

U.S. Pat. document Nos. 4,311,883, 4,647,726.

SUMMARY OF INVENTION

An inexpensive to produce and easy to use method of locking and unlocking an unused modular jack receptable by utilzing a plug externally mounted to a sliding bolt lock, said plug being inserted into unused socket. The sliding bolt is then wedged between fixed member of plug and resilient leaf spring preventing compression of said spring and therein preventing removal of plug from the socket. In the unlocked position, the bolt may be returned to its original position in casing to allow for compression of leaf spring on plug and removal of said plug from communication socket. This plug may be inserted into a modular telephone jack lock making use of line not possible, or it can be inserted into the modular jack receptacles on telephones, computer modems fax machines or telephone anwering machines to make them unusable while plug is inserted while allowing for the unlocking of said device for authorized use.

BACKGROUND OF INVENTION

The existing jack lock patented in 1982 by Susan Kidney is a bulky device which has a method for securing the line to the jack lock. Most phone systems of today have the modular socket at both ends and securing the line is no longer necessary since it can be unsnapped at both ends. The patented jack lock has the leaf spring inclosed in the locking mechanism case; the turning of the key causing depression of the inclosed leaf spring and removal of the plug.

In my present invention the leaf spring is outside of said casing and is depressed by the user when sliding bolt is not in wedged position. This sliding bolt mechanism is clearly different from previous designs, and less expensive to produce.

The patented invention of Richard Blum is a one-time closure device used to permanantly secure equipment while it is still connected electrically and usable. His invention is used to prevent the theft of attached usable equipment, not as the intention of my invention to prevent the unauthorized use of said equipment or preventing the electronic connection of said equipment to telephone line by locking plug in equipment or in wall socket, thereby preventing its ability to be used; and the ability to unlock said plug so that equipment can then be utilized when needed.

DETAILED DESCRIPTION OF PREFERRED EMBODIMENT

Figure 1:
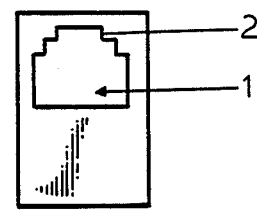
FIG. 1 is a front view of a modular communications socket

FIG. 1 shows a standard modular socket which is used to connect electronic devices to telephone communication lines. These sockets are both on the equipment and used as wall plugs to make the electical connection to said telephone lines. There is a socket (1), and socket retention corner (2). A standard modular plug is inserted into socket and the leaf spring of plug snapfits into socket automatically with corners of leaf spring, locked behind retention corners (2) of socket. In order to release a standard modular plug, the user compresses leafspring and withdraws plug from outlet.

Figure 2:
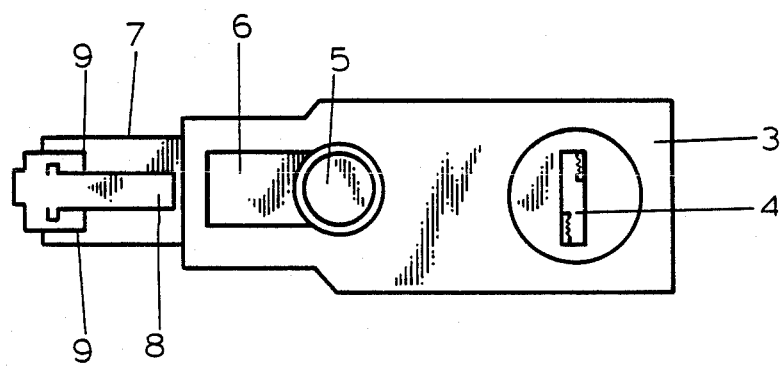
FIG. 2 is top view of modular lock with bolt in casing (unlocked)

FIG. 2 shows a modular plug (7) rigidly attached externally to the casing (3) of a sliding bolt lock. The key hole is in the vertical position (unlocked). A sliding bolt knob (5) is attached to a sliding bolt (6) inside casing. The modular plug with a leaf spring (8) and retention corners (9) would be snapped into communication socket.

Figure 3:
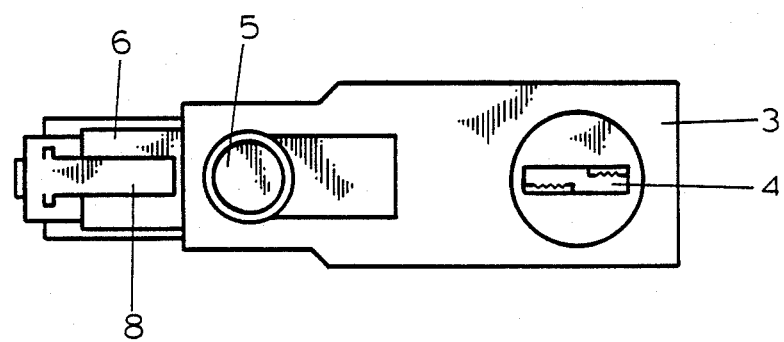
FIG. 3 is top view of modular lock with bolt extended (locked)

FIG. 3 shows the sliding bolt (6) wedged between fixed memeber of plug and leaf spring (8) preventing depression of spring. The bolt was moved forward by sliding the bolt knob (5) forward. The key then rotates counter clockwise securing bolt in protruded position. If said plug was in communication socket in this locked position compression of leaf spring would not be possible and removal of said plug prevented.

By turning key clockwise sliding bolt is then allowed to be returned to original position inside casing so that leaf spring can be compressed.

Figure 4:
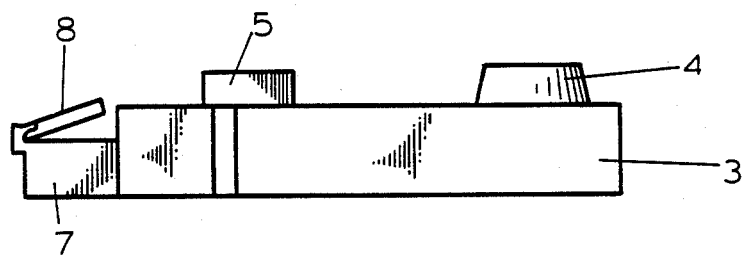
FIG. 4 is side view of modular lock with bolt in casing (unlocked)

FIG. 4 shows side view of modular jack lock with sliding bolt inside caseing with plug in position to be inserted into a modular socket.

Figure 5:
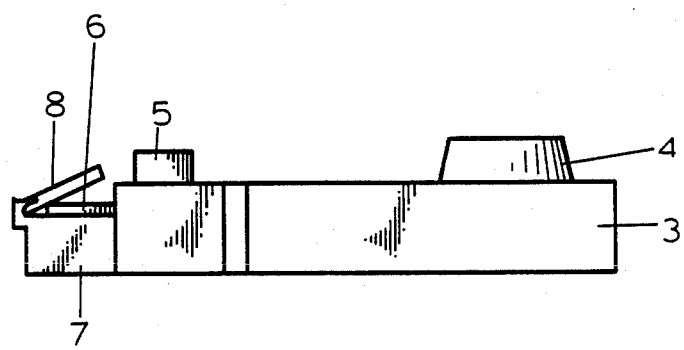
FIG. 5 is side view of modular lock with bolt extended (locked)

FIG. 5 shows bolt wedged between fix member of plug and leafspring so that leaf spring can not be depressed. If said plug is in communication socket in this position leaf spring cannot be depressed and removal of plug from socket is prevented.

Figure 6:
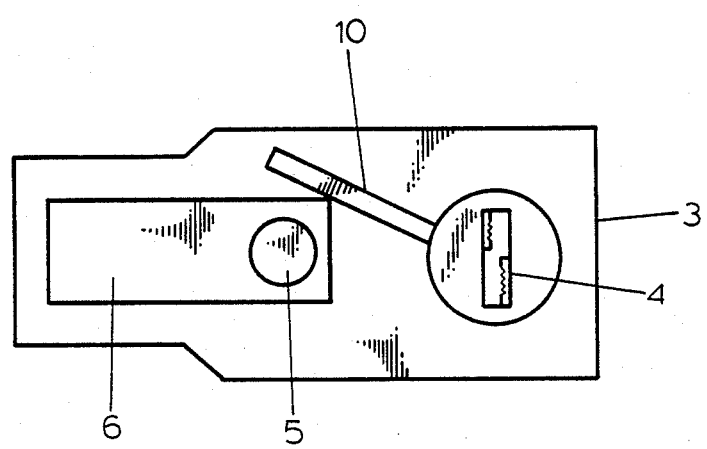
FIG. 6 is internal view of locking mechanism with bolt inside casing (key lock)

FIG. 6 shows internal locking mechanism with sliding bolt (6) inside casing (3) key hole in vertical position with rotating locking arm above sliding bolt.

Figure 7:
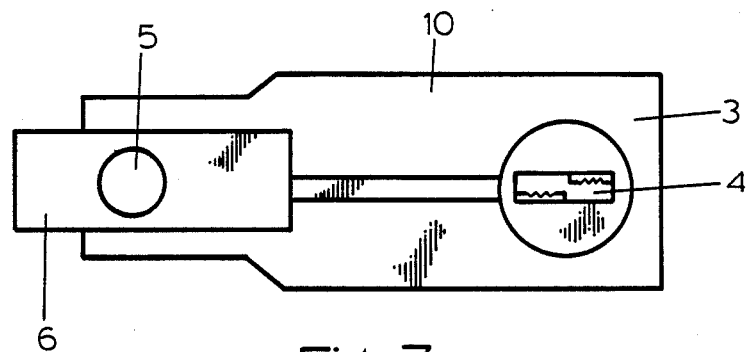
FIG. 7 is internal view of locking mechanism with bolt extended out of casing. (Key lock)

FIG. 7 shows sliding bolt in locking position partially outside of case, with key slot rotated so that connected rotating bar prevents inward displacement of sliding bolt.

Figure 8:
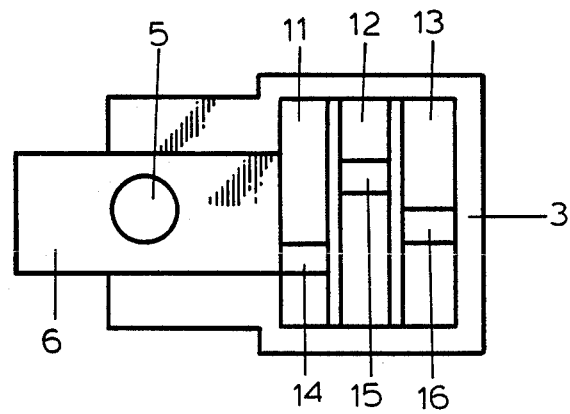
FIG. 8 internal view of locking mechanism for a 3 tumbler combination lock with bolt extended outside case (locked)

FIG. 8 shows bolt in locked position with part of sliding bolt outside caseing. Three tumblers of combination lock (11,12,13) having their egress slots in unaligned position preventing bolt from being able to return to position inside casing. Egress slots are represented by (14,15,16).

Figure 9:
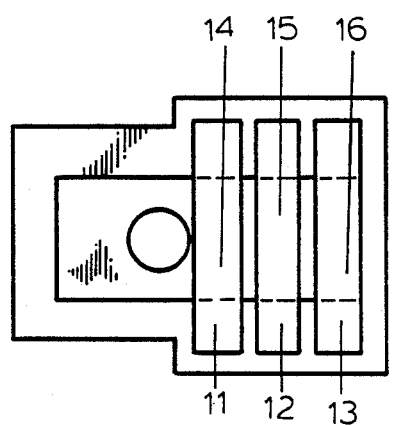
FIG. 9 is internal view of locking mechansim for a 3 tumbler combination lock with bolt inside case (unlocked)

FIG. 9 shows bolt returned to casing by aligning the three egress slots to form a channel which allows bolt to pass through and be moved into said casing.

In using this modular communications jack lock, the user would snap plug into modular socket while bolt of lock is inclosed in lock casing. The plug would automatically snap into said socket and be held in place, by retentive corners of leaf spring and retaining corners of socket. The leaf spring then automatically, returns to its original position. At this point the bolt would be slid out of casing and wedged between the fixed member of plug and the leaf spring preventing depression of leaf spring and therefore preventing removal of plug from socket. The user then would lock the sliding bolt in this position by either of the methods shown; a key operated lock or a combination lock, both preventing the return of bolt into said casing. To unlock plug the user would unlock said bolt by either key or dialing proper combination allowing for return of bolt into casing, allowing for leaf spring to be compressed against fixed member of plug and removal from socket.

While two methods of utilzing a sliding bolt lock with a modular plug externally mounted to said casing have been shown, it is not my intent to limit the design of the internal lock mechanism to effect the same results.

I claim:

1. A modular communications jack lock comprising a lock mechanism disposed in a case with a connecting plug mounted on said case for snap engagement in a modular communications socket and leaf spring means for snap locking said plug within said socket, said leaf spring means being resiliently attached to said plug at a point remote from the attachment of said plug to said case; said lock mechanism preventing disengagement of the connecting plug from the socket by causing displacement into said leaf spring means of a sliding wedge means disposed in said case to prevent depressing thereof in the locked position and permitting said wedge to be withdrawn from leaf spring means when the lock mechanism is in the unlocked position to permit disengagement of the plug from the socket.

2. The modular jack lock of claim 1 wherein said lock mechanism is a sliding bolt.

3. The modular jack lock of claim 1 wherein said lock is a key operataed tumbler lock.

4. The modular jack lock of claim 1 wherein said lock mechanism is a combination lock.

5. The modular jack lock of claim 1 is adapted to engage a modular telephone communication socket.

6. The modular jack lock of claim 1 is adapted to engage electronic equipment which utilizes a modular jack socket.

* * * * *